L. F. JORDAN.
VEHICLE WHEEL.
APPLICATION FILED SEPT. 30, 1918.
1,351,252.
Patented Aug. 31, 1920.
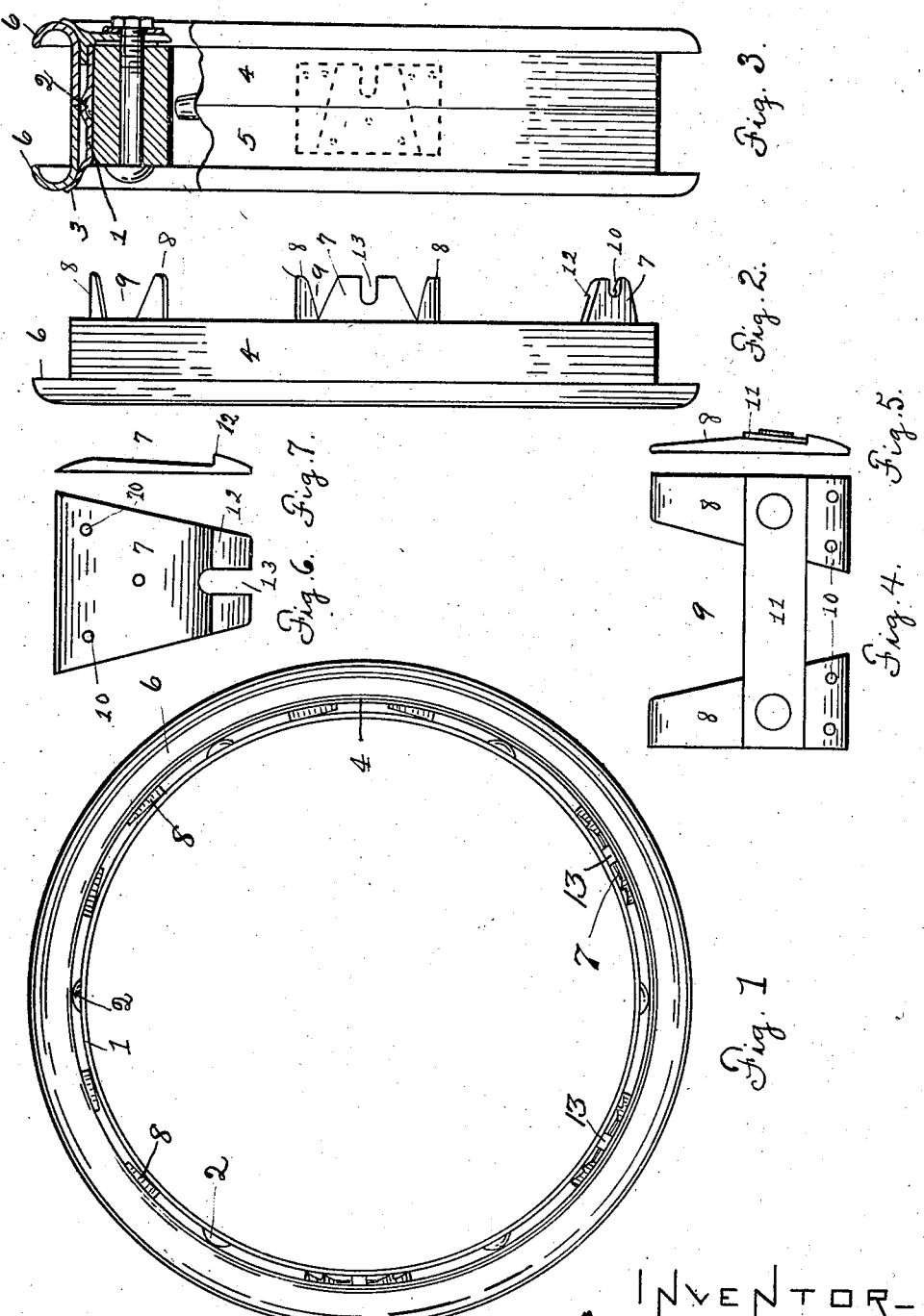

UNITED STATES PATENT OFFICE.

LINWOOD F. JORDAN, OF PORTLAND, MAINE.

VEHICLE-WHEEL.

1,351,252.   Specification of Letters Patent.   Patented Aug. 31, 1920.

Application filed September 30, 1918. Serial No. 256,197.

*To all whom it may concern:*

Be it known that I, LINWOOD F. JORDAN, a citizen of the United States, residing at Portland, in the county of Cumberland and State of Maine, have invented certain new and useful Improvements in Vehicle-Wheels, of which the following is a specification.

This invention relates to improvements in vehicle wheels for holding pneumatic tires. It is specially designed to provide a felly and rim constructed and arranged so that the rim may be easily and quickly removed from the felly. It also relates to a two part rim divided circumferentially and provided with means secured to its inside face for conveniently and securely locking the two parts together.

In the drawing herewith accompanying and making a part of this application, Figure 1 is a side elevation of a part of a wheel embodying my improved construction; Fig. 2 is a plan view of one of the rim members; Fig. 3 is a plan view with parts broken away of my improved rim applied to a wheel having a felly and felly band; Figs. 4 and 5 are plan and edge views respectively of one interlocking member and Figs. 6 and 7 are plan and edge views respectively of the other interlocking member.

Same reference characters indicate like parts in all the figures.

In said drawings, 1 is a permanent rim which may be of any suitable construction exceept that it is provided on its external face with a plurality of spacing projections 2 for spacing the rim from the felly to provide space for the interlocking parts. These may be formed integrally with or secured to the felly or felly band and alone form no part of my invention. The felly band, when used, is provided with the usual curved flange 3.

The rim comprises two similar circumferentially divided members 4 and 5. These members are usually formed of rolled metal and are provided with the usual bead retaining flanges 6. For convenience in construction and operation, one member is provided inside with a series of tapered locking tongues 7 extending beyond the inner edge thereof and the other member is provided with coöperating locking parts 8 extending beyond the inner edge thereof and being provided with tongue receiving openings 9. The locking parts 8 may be formed by two plates as shown or from a single plate with the tongue receiving opening therein. The rim members are provided with a plurality of these locks and the locking parts 7 and 8 are secured to the inside of the rim members in any convenient manner as shown by rivets 10. Outwardly curved or arch shaped spring keepers 11 span said tongue receiving openings and the tongues are provided with raised lugs 12 which, when the two rim members are brought together, pass under and engage the keepers and then to fall and lock the rim members firmly together. For convenience in unlocking the members, the tongues are provided in the ends with recesses 13 to receive a key to raise the keepers out of the path of the locking latches. Any convenient key may be used, preferably a key having a cam-shaped end adapted, when turned, to lift the keeper to clear the latch.

The two members may be exactly similar, each having tongues or tongue receiving members arranged so that one member may be used on either side and the air valve stem receiving opening always register. To accomplish this purpose, each side of the rim has an equal number of tongues and tongue receiving openings, the tongues following each other in succession, and the tongue receiving openings following each other in succession.

I claim:

1. A vehicle wheel rim comprising two duplicate members, one member provided with locking tongues and the other member provided with tongue receiving sockets, said tongues and sockets being located on the inside of the rim members, and springs fastened at each end to the socket members and spanning said sockets.

2. A vehicle wheel comprising two similar rim members, each having an equal number of tongues and tongue receiving sockets, the tongues following each other in succession and the tongue receiving sockets following each other in succession, and means combining with the tongues and tongue receiving sockets for locking the two rim members together.

In testimony whereof I affix my signature.

LINWOOD F. JORDAN.